(12) United States Patent
Pagett

(10) Patent No.: X8837
(45) Date of Patent: May 22, 1835

(54) THRASHING MACHINE

(76) Inventor: Washington F. Pagett

Washington F. Pagett
Letters Patent

The Schedule referred to in these Letters Patent and making part
of the same containing a description in the words of the said Washington
F. Pagett himself of his improvement in the Thrashing Machine

---

To all to whom these presents shall come. Be it known that
I Washington F. Pagett of White Post in the County of Frederick and
State of Virginia have invented a new and usefull improvement
in the Thrashing Machine and that the following is a full clear and
exact description of the construction and operation of the said machine as
invented or improved by me. The concave bed is one of the parts to
which I apply my improvement and this I construct in the following
manner. It is to be formed into the usual portion of the circumfer-
ence of the cylinder say from about eight to ten inches and armed with
the teeth in the like manner. I also place it on the upper portion of the
cylinder above the centre instead of below as is commonly used. It
is securely fastened at that part of the cylinder over which it is to
work to a moveable frame which is to consist of a broad piece of about
fifteen inches in breadth by about three on the edge. and about two
and a half feet in length. one piece to be secured to each end of the con-
cave bed where such a portion of the edge at the top of the piece is to be
removed as will admit the concave. As the frame is to be used at one
end of the machine in a vertical position the cylinder of course is
placed at that end & this frame will be placed at a proper distance in
front of it. From the bottom of the concave these pieces are framed into a
curve so as to pass clear of the cylinder and at about twenty inches below
the concave, a broad flat slide board is framed in to slope from the side
of the curve next to the cylinder towards the outside of the machine directing
the grain which falls on it towards the bottom, or the floor. From the under
edge of this slide board a broad piece follows the curve of the cylinder
towards the under part thereof for a short distance where it laps on
to to the top of a long slide board which conducts the straw beneath the cylin-
der to the other end of the frame of the machine & this broad piece protects the
springs beneath from dirt &c. Below this broad piece last mentioned
and at the bottom of each end piece of the moveable frame is to be an arrange
ment to allow of a receding motion of the concave in case of the passage of a
stone &c. thus a small friction roller is made to project below the piece
somewhere near the centre upon which the end of a spring is to bear &
which spring is to be continued horizontally beneath the long slide board
from the friction roller towards the other end of the machine frame as
may be necessary. The shape of that end of the spring which bears against the
friction roller is triangular having one side attached to the spring & the
angular edge to be opposed to the roller. thereby forming an inclined
plane over which it rises on the front & falls on the back side thereof
whenever the accidental passage of a stone or other body causes the concave
bed to yield from the cylinder. When the roller passes over the angle a
pressure is necessary to be applied to the concave bed to send it to its place
again. I also apply another mode of effecting the same end of allowing the
concave
to recede thus. A long arm is secured at the bottom of each end piece
to be continued under the long slide board in the same direction as
the spring & from one to the other of which at the end furnished from the
frame is to extend a broad piece or box for the reception of as much weight
as may be found necessary to carry the bed back again to its place af-
ter having yielded to the stone &c. & which must be sufficient to keep it
to its place during the operation of threshing. This mode may be used instead
of the spring, and I think it preferable. Between the first described slide
board and the concave a grate is to be used consisting of bent rods placed
vertically, but following the general curve of the moveable frame &
cylinder for the passage of the grain in front of the rea. and in front of
this grate an iron shaft is to pass through the end pieces forming the sides
of this frame attached to the concave and securely keyed to them. having
the ends of said shaft to project sufficiently beyond the said side pieces of
this frame to equal the length of the cylinder shaft & to rest upon boxes in
which they will revolve (as the concave recedes) placed on the same support
ing ing timber as the cylinder. And this shaft must be placed so far above the centre of the distance between the concave bed and the ends of the side pieces where the friction rollers are placed is to give sufficient leverage when accommodated to the strength of the Spring (or the weight) as to bring the bed to its place after the stone &c has passed. The staves or bars of which the cylinder is composed I secure to the heads by means of screws placing the staves above the band. and I place secret nuts between the band & the head or by screwing the bolts into the band. which is intended to give more facility to repairs by unscrewing the stave and removing it without having to move the bands. The main cylinder shaft is to revolve on a box of metal at each end as is usual but to one of these boxes I adapt the following improved construction viz. The round end of the shaft is to have a groove turned in it near about the centre (& the lower box may have a corresponding rise to fit into it resting upon the lower bush; over this I place a cap thus ~~thus~~ formed. The hollow is adapted to the size of the end of the shaft & on each side of it a portion somewhat wider than the groove in the axle is removed to a sufficient distance from the hollow to allow of the reception of a square piece calculated to fit into it but somewhat narrower that it may slide both backward or forward across the opening when required. The end of this square block that is to bear upon the round end of the shaft is shaped to fit it in the same curve as the hollow and has one of the vertical sides (or length of the box) to project in a thin [plate] sufficiently forward or into the hollow to bear on to the bottom of the groove and the side of this projection is to bear against the square side of the groove. The square piece on the other side of the hollow in the cap will have the same shape & projection. but this last will be on the opposite side of said square piece. Through these pieces a screw bolt is to pass near the centre of each. the thread of which is removed at each end thereof & a head is secured at one & a rivet at the other or any such fastening for a similar intent viz of rendering the screw stationary or not to be withdrawn from this place. The use of this screw is to carry forward or backward the square piece cut with a female screw when the bolt is turned in order to press against the side of the the groove & thereby keeps the shaft steady. The projecting ends of these
pieces may be made of harder metal and moveable so as to renew them
when necessary. Oil is admitted through a hole at the top. I also propose
another mode of operating the spring by means of an extension of the inclined
plane at the triangular end by which the front side thereof is carried
upwards from the angular edge into a curve forming part of a smal-
ler circle than would be described by the friction roller as the bed re-
cedes. so that the roller not passing the point but running up the curve
the resistance of the spring would bring it back again after the stone &c
had passed. Operation. The square shaft with rounded ends forming
a pivot on which the moveable frame can swing should any stone &c be
driven by the cylinder into the concave. it will yield or recede outwards
by means of the revolutions of the friction roller over the front inclined,
the resistance of the spring against which sends it back again should
the stone be small, but should it be large the roller may pass the point of
the angle & then the concave will be required to be thrust back to the bed,
but if the curve is used at the top of the plane the roller does not need
any assistance but is driven down by the resistance of the spring given
the application of the levers & weight the concave equally is brought
against the cylinder by the leverage obtained by the length of the frame
below the pivot shaft. In using the upper cap to any shaft requiring to
be occasionally tightened. The heads of the screw bolts are turned which
as they have threads only within the portion removed on each side the
hollow & passing through the regulating square pieces. these pieces will be
driven closer to the square side of the groove on opposite sides thereof which
will consequently hold the axle steady again when previously worn by fric-
tion. What I claim as my invention and not previously known in the
above described machine is First. The arrangements of the spring and
friction roller as described at the bottom of the moveable frame to allow of
the receding motion of the concave. & also the other construction for ob-
taining the same end by means of the long arms and box or broad piece
to apply a weight for the purpose. 2'dly. The manner or method of
constructing the cap as described for the purpose of adjusting the position
of of the main shaft or any other shaft. In testimony that the above is a full
and exact description of the construction and modes of operation of my
machine as invented or improved by me I have hereunto set my hand this
twenty seventh day of April eighteen hundred and thirty five
Witnesses
C. H. W. Wharton
Henry Stone Washington F. Pagett Exd.
W.C.

[187 6 wd]